(12) United States Patent
Ben-Yehuda et al.

(10) Patent No.: US 8,397,106 B2
(45) Date of Patent: *Mar. 12, 2013

(54) DETECTING NO PROGRESS STATE OF AN APPLICATION

(75) Inventors: Shmuel Ben-Yehuda, Haifa (IL); Dan Pelleg, Hafia (IL); Lance Warren Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/762,226

(22) Filed: Apr. 16, 2010

(65) Prior Publication Data

US 2011/0258493 A1    Oct. 20, 2011

(51) Int. Cl.
*G06F 11/00* (2006.01)

(52) U.S. Cl. ............................. 714/48; 714/10

(58) Field of Classification Search ............ 714/48
See application file for complete search history.

(56) References Cited

U.S. PATENT DOCUMENTS

| | | | |
|---|---|---|---|
| 6,993,681 B2* | 1/2006 | Haynes et al. | 714/23 |
| 7,577,550 B2 | 8/2009 | Ozonat et al. | |
| 2003/0196136 A1* | 10/2003 | Haynes et al. | 714/13 |
| 2007/0028219 A1 | 2/2007 | Miller et al. | |
| 2007/0179746 A1 | 8/2007 | Jiang et al. | |
| 2008/0022282 A1* | 1/2008 | Cherkasova et al. | 718/102 |
| 2008/0256545 A1* | 10/2008 | Akidau et al. | 718/104 |
| 2009/0031176 A1 | 1/2009 | Ide et al. | |
| 2009/0199196 A1* | 8/2009 | Peracha | 718/104 |
| 2009/0257352 A1* | 10/2009 | Imai | 370/241 |
| 2010/0217865 A1* | 8/2010 | Ferris | 709/226 |
| 2011/0010581 A1* | 1/2011 | Tanttu et al. | 714/11 |
| 2011/0029748 A1* | 2/2011 | Nakamura et al. | 711/162 |
| 2011/0093413 A1* | 4/2011 | Calcaterra et al. | 706/11 |
| 2011/0145415 A1* | 6/2011 | Osaki et al. | 709/226 |
| 2011/0320054 A1* | 12/2011 | Brzezowski | 700/291 |

OTHER PUBLICATIONS

Kai Shen et al., I/O System Performance Debugging using Model-Driven Anomaly Characterization, 4th USENIX Conference on File and Storage Technologies, 309-22, 2005, USENIX Association.

Kai Shen et al., Reference-Driven Performance Anomaly Identification, SIGMETRICS/Performance'09—Proceedings of the 11th International Joint Conference on Measurement and Modeling of Computer Systems, v 37, n 1, p. 85-96, 2009, Association for Computing Machinery.

Wang et al; Reliability Micro Kernel: Providing Application—Aware Reliability in the OS, IEEE Transactions on reliability, IEEE service center, Piscatway, NJ USA, vol. 56, No. 4, Dec. 2007, 597-614.

(Continued)

*Primary Examiner* — Kamini Patel
(74) *Attorney, Agent, or Firm* — Garg Law Firm, PLLC; Rakesh Garg; Libby Z. Toub (57) ABSTRACT

A method, system, and computer usable program product for detecting a no progress state of an application are provided in the illustrative embodiments. A resource usage and an output of a set of applications are monitored. The resource usage and the output are measured to determine a resource usage value and an output value at a given time. A determination is made whether the resource usage value is included in a sub-range of a resource usage scale and the output value is included in a sub-range of an output scale where the sub-range of the resource usage scale corresponds to the sub-range of the output scale. The no progress state of the application is detected if the determination is negative

20 Claims, 6 Drawing Sheets

OTHER PUBLICATIONS

Java Management, Class GaugeMonitor, Java™ Platform Standard Ed. 6, 1-8, Jun. 21, 2011.
European patent Office, International Searching Authority, EP2011055928, Jun. 16, 2011.
Anon, "Java Platform SE 6 Class GaugeMonitor", 2006, 1-8, URL: http://monitorn.tlu.ee/{jaagup/kool/java/abiinfo/docs/6/api/javax/management/monitor/gaugemonitor.html.

* cited by examiner

| RESOURCE USAGE 502 | OUTPUT 504 | MEASUREMENT TARGET 506 |
|---|---|---|
| LOW THRESHOLD 1 | LOW OUTPUT THRESHOLD 1 | APP 1 |
| HIGH THRESHOLD 1 | HIGH OUTPUT THRESHOLD 1 | APP 1 |
| MIDRANGE 1 | MIDRANGE OUTPUT 1 | APP 1 |
| LOW THRESHOLD 2 | HIGH OUTPUT THRESHOLD 2 | APP 2 + APP 3 + PROCESS 4 |
| LOW THRESHOLD 3 | MIDRANGE OUTPUT 2 | APP 2 + APP 3 + PROCESS 4 |
| HIGH THRESHOLD 2 | HIGH OUTPUT THRESHOLD 2 | APP 2 + APP 3 + PROCESS 4 |
| HIGH THRESHOLD 3 | LOW OUTPUT THRESHOLD 2 | APP 2 + APP 3 + PROCESS 4 |
| . . . | . . . | . . . |

508 (rows for APP 1)
510 (rows for APP 2 + APP 3 + PROCESS 4)
500

*FIG. 7*

DETECTING NO PROGRESS STATE OF AN APPLICATION

BACKGROUND OF THE INVENTION

1. Field of the Invention

The present invention relates generally to an improved data processing system, and in particular, to a computer implemented method for monitoring a data processing system's performance. Still more particularly, the present invention relates to a computer implemented method, system, and computer usable program code for detecting no progress state of an application executing in a data processing system.

2. Description of the Related Art

Circumstances present in a data processing system influence the execution of applications therein. For example, a data processing system has to be able to provide suitable resources to an application for the application to execute as intended. As another example, a processor has to be available to execute the instructions associated with an application in a timely manner for the performance of the application to be within an acceptable range.

Under certain circumstances, an application may fail to perform an intended function. In many cases, upon such a failure, an application enters an error state. For example, an error state may be that the application crashes or exits execution unexpectedly. Another example of an error state may be that the application reports an error code corresponding to a failed operation.

Other applications, such as an operating system of the data processing system, include functions for detecting the error states presented by the executing applications. Such applications can then take suitable actions to maintain the data processing system's stability and performance. For example, an operating system may terminate a process associated with the application and free the resources tied up by that process. As another example, a monitoring application may trap the error code generated by an application and cause the application to gracefully exit execution to perform another operation.

Under certain circumstances, an application may not enter an error state but the continued execution of the application may be undesirable in other respects. Detecting such conditions in a data processing system is difficult, presently unavailable, and desirable for improved performance of the data processing system.

SUMMARY OF THE INVENTION

The illustrative embodiments provide a method, system, and computer usable program product for detecting no progress state of an application. An embodiment monitors a resource usage and an output of a set of applications. The set of applications includes the application. The application is executing in a data processing system. The embodiment measures the resource usage and the output to determine a resource usage value and an output value at a first time. The embodiment determines whether the resource usage value is included in a sub-range of a resource usage scale and the output value is included in a sub-range of an output scale where the sub-range of the resource usage scale corresponds to the sub-range of the output scale. The embodiment detects the no progress state of the application if the determination is negative.

In another embodiment, the monitoring is performed over a monitoring period. The embodiment further selects the set of applications. The embodiment configures a set of data processing systems for normal operation of the set of applications. The set of data processing systems includes the data processing system. The embodiment measures a normal resource usage and a normal output of the set of applications at a predetermined interval during a training period. The embodiment identifies a first set of thresholds in a range of resource usage over the training period, forming a set of resource usage sub-ranges between thresholds in the first set of thresholds. The embodiment identifies a second set of thresholds in a range of output over the training period, forming a set of output sub-ranges between thresholds in the second set of thresholds. The embodiment maps a resource usage sub-range to an output sub-range.

In another embodiment, the mapping indicates a measure of output to be expected for a given measure of resource usage when no application in the set of applications is in the no progress state.

In another embodiment, a resource usage sub-range in the set of resource usage sub-ranges is mapped to more than one output sub-ranges in the set of output sub-ranges.

Another embodiment further notifies a second application about the no progress state of the application.

Another embodiment further prevents the application from continuing to execute in the no progress state using a second application.

In another embodiment, a resource whose usage is being measured is a computing resource of the data processing system used by the application.

In another embodiment, the first time is within a monitoring period.

In another embodiment, the application is detected to be in the no progress state when the resource usage value is included in the sub-range of the resource usage scale and the output value exceeds a corresponding sub-range of the output scale.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The invention recognizes that under certain circumstances, continued execution of an application may not be desirable even though the application has not entered an error state. A "no progress" state is such a state of execution of an application. A no progress state is a state of execution of an application where the application continues to consume or reserve resources without producing suitable or expected output.

For example, the invention recognizes that an application may continue to wait for a prolonged period for a particular resource to become available. While waiting, the application may continue to lock or consume other resources without producing any output, or producing lower than expected or threshold volume of output. In other words, the application may be in a no progress state.

Because the application does not produce an error or enter an error state while waiting, an operating system may deem the application to be healthy and allow the application to continue to execute in the no progress state. The invention recognizes that allowing such no progress state to go undetected wastes computing resources and may even deteriorate the overall system performance.

As another example, the invention recognizes that an application may include an error that causes a computation to consume a large amount of processor cycles without producing a result. Again, the application may be executing in a no progress state. Again, the operating system may deem the application healthy as the application simply keeps performing the computation without entering an error state. The invention recognizes that allowing such no progress state to go undetected wastes computing resources and may even deteriorate the overall system performance.

The invention recognizes that an application may enter a no progress state for many other reasons. Some additional reasons that may cause the no progress state of an application may be bugs in the software, errors in the configuration of the application, and overloading of system resources.

The invention further recognizes that an application may also enter a no progress state if an algorithm therein performs as expected for most scenarios but the application experiences a scenario for which the algorithm may be inefficient. In a no progress state addressed by an embodiment of the invention, an application may make progress and produce output but such progress or output is below a threshold value. In another variation of a no progress state addressed by an embodiment of the invention, an application may produce no output or make no progress at all within a defined period. In another variation of a no progress state addressed by an embodiment of the invention, an application may eventually make progress and produce a result, but such progress may be after consuming such time or amount of resources as may be above a threshold or otherwise unacceptable.

The invention also recognizes that monitoring output level alone of an application may also be insufficient for detecting the no progress state of the application. For example, output of an application is often influenced by the demands being placed on the application. With increasing interactivity with the application, a proportionately increased output can generally be expected. Conversely, a below threshold level of output may only be an indication of a low level of activity with or within the application, and not necessarily an indication of a no progress state of the application.

The illustrative embodiments used to describe the invention generally address and solve the above-described problems and other problems related to no progress state of an application executing in a data processing system. The illustrative embodiments provide a method, computer usable program product, and data processing system for detecting the no progress state of the application.

An embodiment of the invention may enable detection of applications that are consuming or reserving resources without producing desirable outputs. An embodiment may enable existing error state detection functions to successfully detect no progress state of applications as well. An embodiment may be integrated in, or may operate in conjunction with, such existing functions.

The illustrative embodiments are described with respect to data, data structures, and identifiers only as examples. Such descriptions are not intended to be limiting on the invention. For example, an illustrative embodiment described with respect to number of pages output from a web server may be implemented using number of queries served from a database in a similar manner within the scope of the invention.

Furthermore, the illustrative embodiments may be implemented with respect to any type of data processing system. For example, an illustrative embodiment described with respect to a multiprocessor standalone data processing system may be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
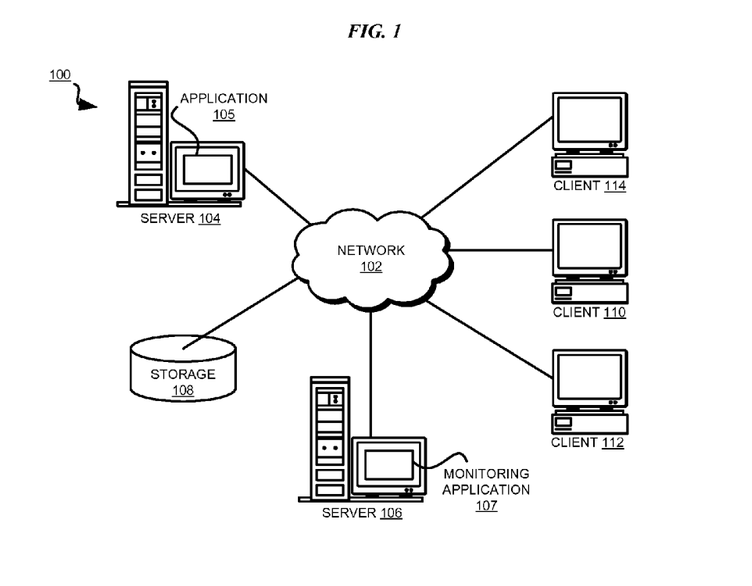
FIG. 1 depicts a pictorial representation of a network of data processing systems in which illustrative embodiments may be implemented.
Figure 2:
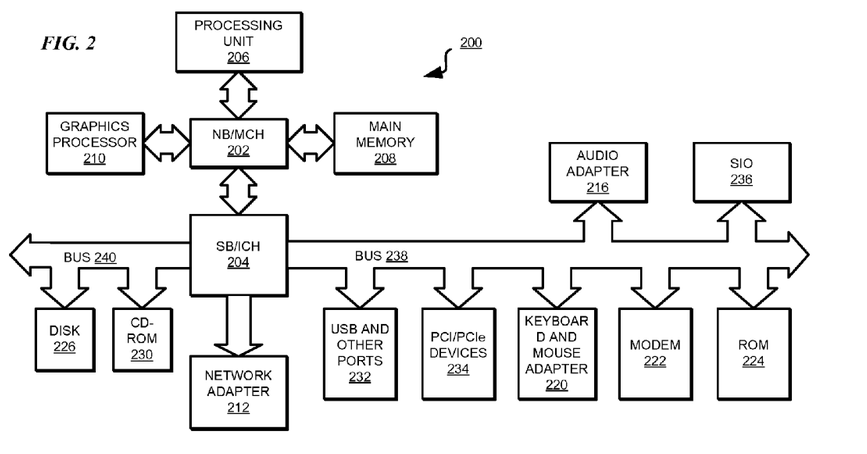
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105. Server 106 may include monitoring application 107. Monitoring application 107 may include an implementation of an embodiment of the invention.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
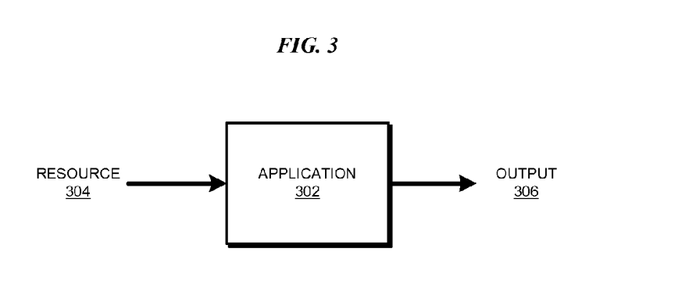
FIG. 3 depicts a block diagram of a general principle of operation of applications with respect to which an illustrative embodiment can be implemented.

With reference to FIG. 3, this figure depicts a block diagram of a general principle of operation of applications with respect to which an illustrative embodiment can be implemented. Application 302 may be similar to application 105 in FIG. 1.

Application 302 consumes set of resources 304 and produces set of output 306. A set of resources is any amount of one or more types of resources consumed in performing computations. Processor cycles, memory space, network bandwidth, data, and electrical power are some examples of resource 304. Resource 304 is resources consumed by application 302. "Resources consumed" according to an embodiment include those resources that are actually consumed, used, or utilized by an application, as well as those resources that are locked, reserved, or otherwise held for present or future use by the application.

A set of output is one or more output of any type of an application. Data transmitted, data stored, entry recorded, notification sent, data published, printout generated, information displayed, and information manipulated are some examples of output 306 possible from an application executing in a data processing system.

Figure 4:
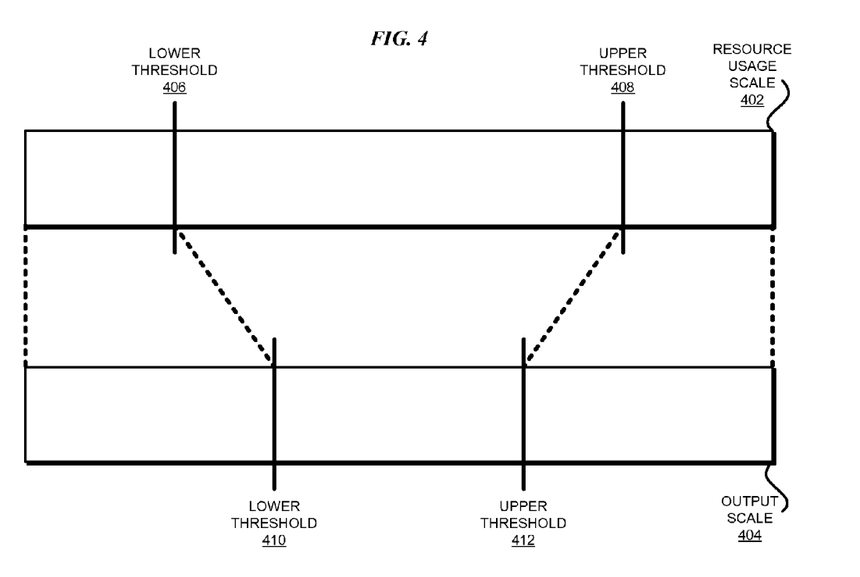
FIG. 4 depicts a block diagram of a relationship between resources consumed and output of an application in a training period in accordance with an illustrative embodiment.

With reference to FIG. 4, this figure depicts a block diagram of a relationship between resources consumed and output of an application in a training period in accordance with an illustrative embodiment. The measurements and measurement scales depicted in this figure may be a result of a monitoring application implementing an embodiment of the invention, such as monitoring application 107 in FIG. 1.

A monitoring application according to an embodiment observes or monitors an example set of applications executing in a data processing system for resources consumed and output produced during a training period. A set of applications is all or parts of one or more applications executing in the same or different data processing systems. Within the scope of the invention, a set of applications may include certain processes associated with an application and exclude certain other processes associated with an application. Thus, a set of applications may include one or more processes, threads, or executables associated with one or more applications executing in one or more data processing systems.

When an application in the set is executing on a data processing system different from the data processing system of another application, the two applications belong in the set of applications if the execution of the first application has some effect on the execution of the second application. For example, two applications in a set may execute on different data processing systems, but certain processes associated with the two applications may compete for a common resource over a network.

A training period is a time period within which an application is deemed to be operating as expected. In other words, the behavior of an application is predictable or as specified under the known circumstances of the application execution, and the application is not in a no progress state, during the training period. The training period may be one or more consecutive or disjoint periods.

The monitoring application according to an embodiment charts the resources consumed by the set of applications in the training period on resource usage scale 402. The monitoring application charts the output produced by the set of applications during the training period on output scale 404.

End-to-end, resource usage scale 402 depicts a range of resource usage by the set of applications over the training period. The range depicted on resource usage scale 402 may be measured by volume, count, elapse, or another suitable unit of measurement. Similarly, end-to-end, output scale 404 depicts a range of output produced by the set of applications over the training period. The range depicted on output scale 404 may be measured by volume, count, frequency, or another suitable unit of measurement.

The monitoring application may create any number of sub-ranges within scales 402 and 404. A sub-range is a portion of a range between two threshold values.

For example, FIG. 4 depicts resource usage scale 402 to include three sub-ranges. The first example sub-range lies between and including the start of the range and lower threshold 406. The second example sub-range lies after lower threshold 406, up to and including upper threshold 408. The third example sub-range lies after upper threshold 408, up to and including the end of the range.

FIG. 4 also depicts, as an example, output scale 404 to include three sub-ranges. The first example sub-range of output scale 404 lies between and including the start of the range of output scale 404 and lower threshold 410. The second example sub-range of output scale 404 lies after lower threshold 410, up to and including upper threshold 412. The third example sub-range of output scale 404 lies after upper threshold 412, up to and including the end of the range of output scale 404.

After charting the resource usage and output production over the training period, the monitoring application may map sub-ranges of resource usage scale 402 to the sub-ranges of output scale 404. For example, the first sub-range of resource usage scale 402 may correspond to the first sub-range of output scale 404. In other words, during the training period, the monitoring application indicates that when the set of applications is consuming resources in the first sub-range of resource usage scale 402, the set of applications is producing output in the first sub-range of output scale 404.

The second sub-range of resource usage scale 402 may similarly correspond to the second sub-range of output scale 404. The third sub-range of resource usage scale 402 may similarly correspond to the third sub-range of output scale 404. Mapping sub-ranges of resource usage scale 402 to output scale 404 in this manner enables the monitoring application to create a profile of operation of the set of applications.

Generally, any sub-range of resource usage scale 402 may correspond to the any one or more sub-ranges of output scale 404. In other words, one sub-range on one scale may correspond to any number of sub-ranges on another scale. Furthermore, the sub-ranges on a scale may each be of any suitable size without limitation and need not be equal or proportionate to one another.

Additionally, sub-ranges on different scales may correspond to one another but may be of same or different sizes within the scope of the invention. In one embodiment, a sub-range may not be a range but a specific value on a scale.

Figure 5:
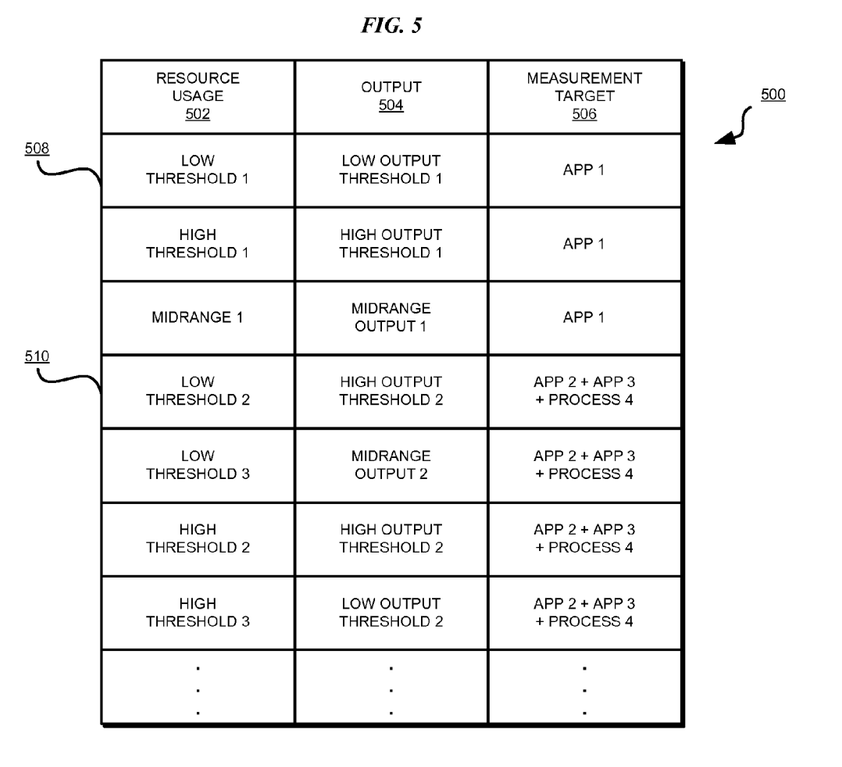
FIG. 5 depicts a mapping maintained by a monitoring application in accordance with an illustrative embodiment.

With reference to FIG. 5, this figure depicts a mapping maintained by a monitoring application in accordance with an illustrative embodiment. Table 500 may be an example way of storing the mapping of sub-ranges, such as in the example depiction of FIG. 4. In an implementation, table 500 may be substituted by any other suitable form of documenting the mapping of resource usage sub-ranges and output sub-ranges of sets of applications.

As an example, table 500 may store the mapping of resource usage sub-ranges to output sub-ranges for one or more sets of applications or other combinations of applications, processes, threads, or executables. Table 500 may store a resource usage sub-range information in column 502, an output sub-range information in column 504, and information, such as an identifier, of the corresponding set of applications in column 506.

A row of data in table 500 forms one mapping for a given set of applications. Table 500 may maintain one or more rows of mapping for a particular set of applications.

Table 500 shows some example mappings for the clarity of the illustrative embodiment. Row 508 depicts a mapping of an identifier of a sub-range of resource usage scale, "Low threshold 1," to an identifier of a sub-range of an output scale, "low output threshold 1," for a set of applications that includes only application "App. 1." As another example, Row 510 depicts a mapping of an identifier of a sub-range of resource usage scale, "Low threshold 2," to an identifier of a sub-range of an output scale, "high output threshold 2," for a set of applications that includes application "App. 2," application "App. 3," and process "process 4."

Sub-ranges and sets of applications are represented by example identifiers in FIG. 5. A sub-range or a set of application may be represented in table 500 in any manner suitable for an implementation. Further, note that the identified and mapped sub-ranges may be on different scales for different sets of applications. A single sub-range on one scale may map to more than one sub-range on the other corresponding scale for a given set of applications.

Table 500 depicts other rows with other example variations of mappings within the scope of the invention. The structure of table 500 and the example mappings are not intended to be limiting on the invention. Table 500 may include any number of rows, different columns, and different ways of storing similar mapping information. Many other variations of the mappings will be apparent from this disclosure to those of ordinary skill in the art and the same are contemplated within the scope of the invention.

For example, in one embodiment, multiple rows may provide multiple mappings for the same set of applications, but under different conditions. One or more additional columns may be used in table 500 to identify such conditions. Such columns may enable the selection of appropriate row or rows for comparing the set's performance under similar conditions at a later time.

In certain instances, table 500 may not be implemented at all. For example, in one embodiment, the table may be replaced with a set of rules that are created based on the training period resource usage and output data. For example, a default rule may be that where there are N intervals for resource usage and N intervals for output levels, the resource usage measurement and the output measurement are matched according to a sorted list of the measurements. Another example rule may match a measurement in interval N of resource usage to a measurement in any interval not below N in the output. Many other rules will be apparent from this disclosure and the same are contemplated within the scope of the invention.

Furthermore, because table 500 may be implemented in a variety of ways, or may be absent all together, "mapping" refers to any method or technique of identifying a correspondence between a resource usage data and an output data according to any embodiment of the invention. For example, mapping may be in the form of a set of logic instructions implemented in a rule that associate a resource usage measurement with an output measurement.

Figure 6:
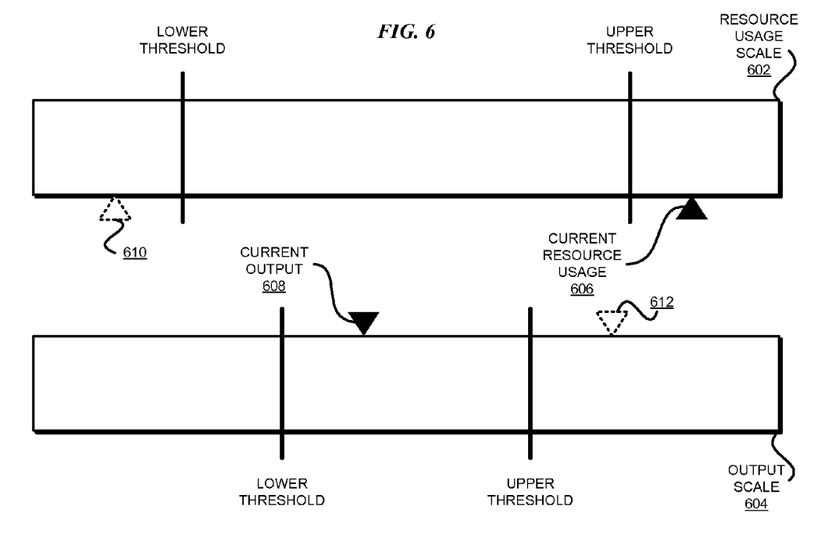
FIG. 6 depicts a block diagram of a relationship between resources consumed and output of an application in a monitoring period in accordance with an illustrative embodiment.

With reference to FIG. 6, this figure depicts a block diagram of a relationship between resources consumed and output of an application in a monitoring period in accordance with an illustrative embodiment. The measurements and measurement scales depicted in this figure may be similar to the corresponding scales in FIG. 4.

A monitoring application according to an embodiment observes or monitors an example set of applications executing in a data processing system for resources consumed and output produced during a monitoring period. A monitoring period is a time period within which the no progress state detection for an application is desired. In other words, the behavior of an application is monitored under then-existing circumstances of the application execution, and an embodiment is to detect whether the application is in a no progress state during the monitoring period. The monitoring period may be one or more consecutive of disjoint periods.

The monitoring application according to an embodiment charts the resources consumed by the set of applications in the monitoring period on resource usage scale 602. The monitoring application charts the output produced by the set of applications in the monitoring period on output scale 604.

End-to-end, resource usage scale 602 depicts a range of resource usage by the set of applications over the training period. Similarly, end-to-end, output scale 604 depicts a range of output produced by the set of applications over the training period. For the clarity of the description and only as an example, the first, second and third example sub-ranges of resource usage scale 602 and output scale 604 lie on the respective scales, and are mapped to one another, as described in FIG. 4.

At some point in the monitoring period, the monitoring application may determine that the current resource usage of the set of applications corresponds to the depicted position of marker 606 on scale 602. During that indicated resource usage, the set of applications produced output that corresponds to the depicted position of marker 608 on scale 604.

Markers 606 and 608 are graphically depicted on graphical scales only as examples. The markers, sub-ranges, and the scales can all be represented in any suitable manner, such as numerically, within the scope of the invention.

Assume, in continuing the example of FIG. 4, the sub-range occupied by marker 606 corresponds to the sub-range between the upper threshold and the end of scale 604. The monitoring application observes that markers 606 and 608 do not occupy corresponding sub-ranges as mapped during the training period. Based on this example observation, the monitoring application may be able to determine that the set of applications may be in a no progress state. For example, as depicted by markers 606 and 608, the set of applications appears to be producing lower than expected output for the amount of resources being consumed during the monitoring period. Such behavior in certain sets of applications may indicate that one or more applications or processes in the set have entered a no progress state.

It is not necessary for a set of applications to produce lower than expected output for a given resource usage to be in a no progress state. For example, markers 610 and 612 may indicate another resource usage and corresponding output production for the set of applications. According to markers 610 and 612, the set appears to be consuming a low amount of resources but producing a large amount of output. Based on certain characteristics of the applications in the set, it may be possible to deduce that an application is in a no progress state and the measure of output at marker 612 is due to a large amount of logging or debugging data being outputted as a result.

Figure 7:
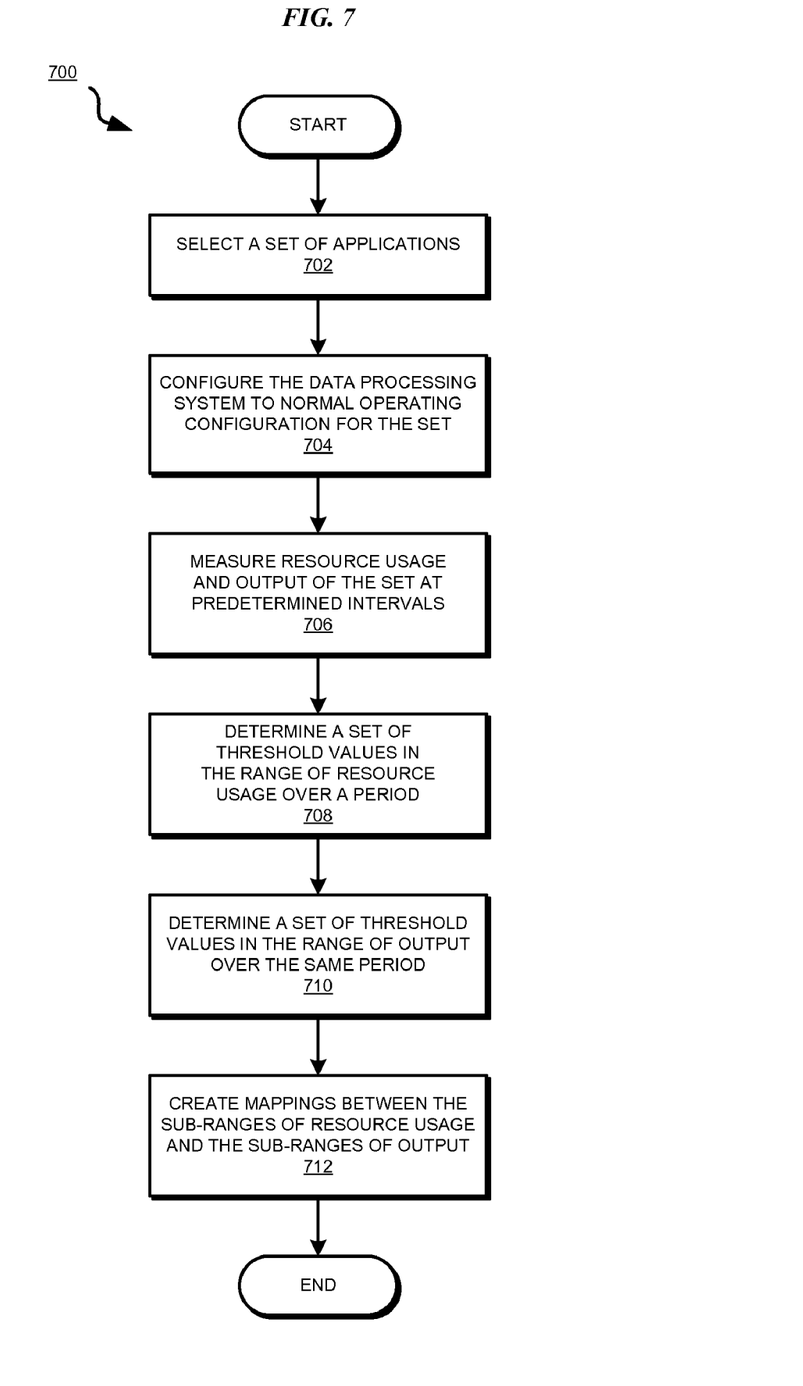
FIG. 7 depicts a flowchart of a process training a monitoring application for detecting no progress state of an application in accordance with an illustrative embodiment.

With reference to FIG. 7, this figure depicts a flowchart of a process training a monitoring application for detecting no progress state of an application in accordance with an illustrative embodiment. Process 700 may be implemented in a monitoring application such as monitoring application 107 in FIG. 1.

Process 7 begins by selecting a set of applications (step 702). Process 700 configures the data processing system to a normal operating configuration for the set (step 704). For example, in step 704, process 700 may start other processes that may be expected to run simultaneously with the set of applications in normal operations. As another example, process 700 may shutdown extraneous processes leaving only the set of applications and minimal system services running to minimize noise in the resource usage and output data. Any suitable configuration that may facilitate creating scales, sub-ranges and mappings, such as in FIGS. 4 and 5, may be configured in step 704 without limitation.

Process 700 measures resource usage and output of the set during the training period, such as at a predetermined interval (step 706). For example, process 700 may perform the measurements at 1-second intervals for a particular set of applications and at 1-minute interval for another set. Process 700 may also synchronize the measurement with a system heart-beat rate or other suitable periods or intervals.

Process 700 determines a set of thresholds within the range of resource usage over the training period (step 708). Process 700 determines a set of thresholds within the range of resource usage over the training period (step 708). Process 700 determines a set of thresholds within the range of output over the training period (step 710). The thresholds mark the beginnings and ends of sub-ranges of resource usage and output as described elsewhere in this disclosure.

Process 700 creates one or more mappings between the sub-ranges of resource usage and the sub-ranges of outputs (step 712). Process 700 ends thereafter.

Figure 8:
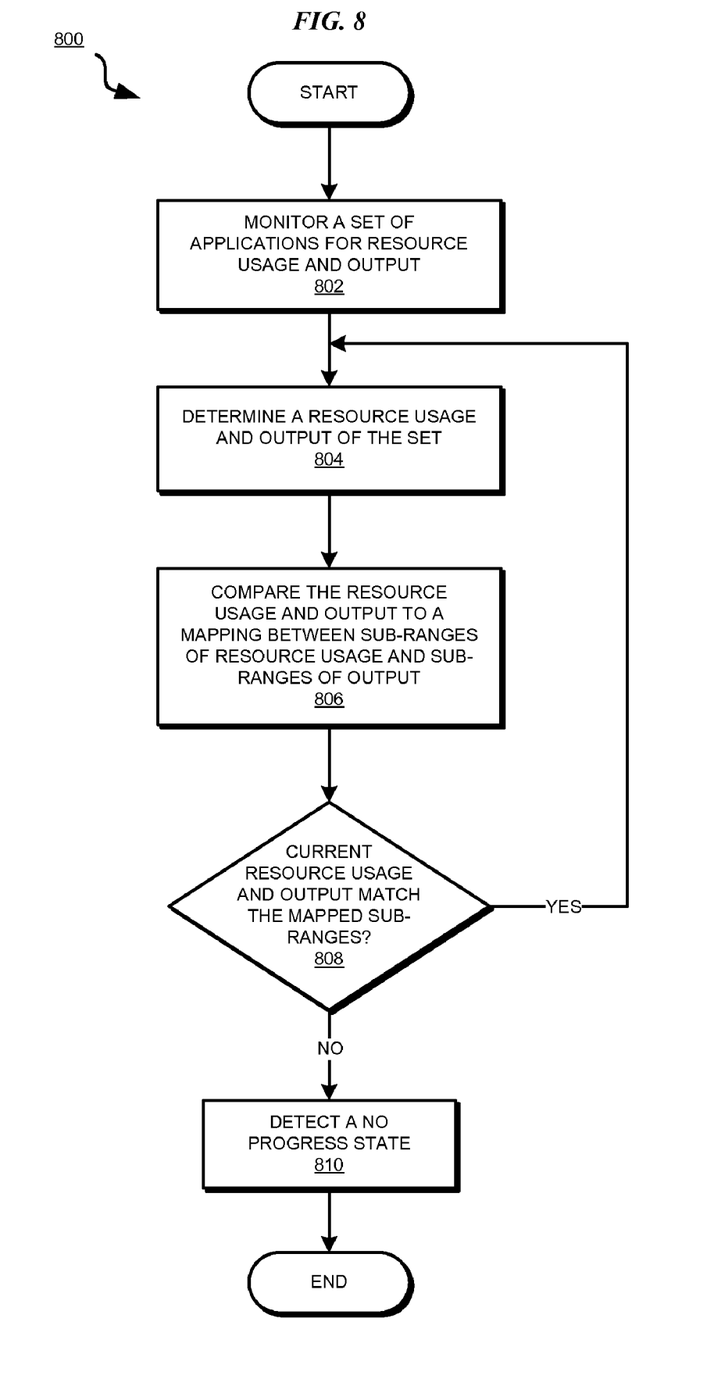
FIG. 8 depicts a flowchart of a process of detecting a no progress state of an application in accordance with an illustrative embodiment.

With reference to FIG. 8, this figure depicts a flowchart of a process of detecting a no progress state of an application in accordance with an illustrative embodiment. Process 800 may be implemented in a monitoring application, such as monitoring application 107 in FIG. 1.

Process 800 begins by monitoring a set of applications for resource usage and output produced (step 802). Process 800 determines a measure of resource usage and output at a point in the monitoring period (step 804). Process 800 compares the resource usage and the output to a mapping between the sub-ranges of resource usage and output for the monitored set of applications (step 806).

Process 800 determines whether the measured current resource usage and output match or correspond to the mapped sub-ranges (step 808). If the measured resource usage and output do correspond to the mapped sub-ranges ("Yes" path of step 808), process 800 returns to step 804 and continues monitoring the set.

If the measured resource usage and output do not correspond to the mapped sub-ranges ("No" path of step 808), process 800 detects a no progress state of at least some constituent of the set of applications (step 810). Process 800 may end thereafter or continue monitoring the set by returning to step 804. Process 800 may notify, log, record, or otherwise distribute or propagate the detection result.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for detecting a no progress state of an application executing in a data processing system. Using an embodiment of the invention, a data processing system can identify applications that may have entered an undesirable state without indicating an error. Detecting such applications or parts thereof may allow the data processing system to perform administrative actions on the application and operate with improved resource usage efficiency.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable storage device including computer usable code for detecting a no progress state of an application, the computer usable code comprising:
    computer usable code for monitoring a resource usage and an output of a set of applications, the set of applications including the application, the application executing in a data processing system;
    computer usable code for measuring the resource usage and the output to determine a resource usage value and an output value at a first time;
    computer usable code for determining whether the resource usage value is included in a sub-range of a resource usage scale and the output value is included in a sub-range of an output scale where the sub-range of the resource usage scale corresponds to the sub-range of the output scale; and
    computer usable code for detecting the no progress state of the application responsive to the determination being negative.

2. The computer usable program product of claim 1, wherein the monitoring is performed over a monitoring period, further comprising:
    computer usable code for selecting the set of applications;
    computer usable code for configuring a set of data processing systems for normal operation of the set of applications, the set of data processing systems including the data processing system;
    computer usable code for measuring a normal resource usage and a normal output of the set of applications at a predetermined interval during a training period;
    computer usable code for identifying a first set of thresholds in a range of resource usage over the training period, forming a set of resource usage sub-ranges between thresholds in the first set of thresholds;
    computer usable code for identifying a second set of thresholds in a range of output over the training period, forming a set of output sub-ranges between thresholds in the second set of thresholds; and
    computer usable code for mapping a resource usage sub-range to an output sub-range.

3. The computer usable program product of claim 2, wherein the mapping indicates a measure of output to be expected for a given measure of resource usage when no application in the set of applications is in the no progress state.

4. The computer usable program product of claim 2, wherein a resource usage sub-range in the set of resource usage sub-ranges is mapped to more than one output sub-ranges in the set of output sub-ranges.

5. The computer usable program product of claim 1, further comprising:
    computer usable code for notifying a second application about the no progress state of the application.

6. The computer usable program product of claim 1, further comprising:
    computer usable code for preventing, using a second application, the application from continuing to execute in the no progress state.

7. The computer usable program product of claim 1, wherein a resource whose usage is being measured being a computing resource of the data processing system used by the application.

8. The computer usable program product of claim 1, wherein the first time is within a monitoring period.

9. The computer usable program product of claim 1, wherein the application is detected to be in the no progress state when the resource usage value is included in the sub-range of the resource usage scale and the output value exceeds a corresponding sub-range of the output scale.

10. The computer usable program product of claim 1, wherein the computer usable code is stored in a computer readable storage medium in a data processing system, and wherein the computer usable code is transferred over a network from a remote data processing system.

11. The computer usable program product of claim 1, wherein the computer usable code is stored in a computer readable storage medium in a server data processing system, and wherein the computer usable code is downloaded over a network to a remote data processing system for use in a computer readable storage medium associated with the remote data processing system.

12. A data processing system for detecting a no progress state of an application, the data processing system comprising:
    a storage device including a storage medium, wherein the storage device stores computer usable program code; and
    a processor, wherein the processor executes the computer usable program code, and wherein the computer usable program code comprises:

computer usable code for monitoring a resource usage and an output of a set of applications, the set of applications including the application, the application executing in a data processing system;

computer usable code for measuring the resource usage and the output to determine a resource usage value and an output value at a first time;

computer usable code for determining whether the resource usage value is included in a sub-range of a resource usage scale and the output value is included in a sub-range of an output scale where the sub-range of the resource usage scale corresponds to the sub-range of the output scale; and computer usable code for detecting the no progress state of the application responsive to the determination being negative.

13. The data processing system of claim 12, wherein the monitoring is performed over a monitoring period, further comprising:

computer usable code for selecting the set of applications;

computer usable code for configuring a set of data processing systems for normal operation of the set of applications, the set of data processing systems including the data processing system;

computer usable code for measuring a normal resource usage and a normal output of the set of applications at a predetermined interval during a training period;

computer usable code for identifying a first set of thresholds in a range of resource usage over the training period, forming a set of resource usage sub-ranges between thresholds in the first set of thresholds;

computer usable code for identifying a second set of thresholds in a range of output over the training period, forming a set of output sub-ranges between thresholds in the second set of thresholds; and computer usable code for mapping a resource usage sub-range to an output sub-range.

14. The data processing system of claim 13, wherein the mapping indicates a measure of output to be expected for a given measure of resource usage when no application in the set of applications is in the no progress state.

15. The data processing system of claim 13, wherein a resource usage sub-range in the set of resource usage sub-ranges is mapped to more than one output sub-ranges in the set of output sub-ranges.

16. The data processing system of claim 12, further comprising:

computer usable code for notifying a second application about the no progress state of the application.

17. The data processing system of claim 12, further comprising:

computer usable code for preventing, using a second application, the application from continuing to execute in the no progress state.

18. The data processing system of claim 12, wherein a resource whose usage is being measured being a computing resource of the data processing system used by the application.

19. The data processing system of claim 12, wherein the first time is within a monitoring period.

20. The data processing system of claim 12, wherein the application is detected to be in the no progress state when the resource usage value is included in the sub-range of the resource usage scale and the output value exceeds a corresponding sub-range of the output scale.

* * * * *